United States Patent
Ballard et al.

Patent Number: 5,081,091
Date of Patent: Jan. 14, 1992

[54] CATALYSTS

[75] Inventors: Denis G. H. Ballard, Chester; Anthony Pickering, Kingsley; Peter J. I. Runciman, Upton; Rowena J. Sellens, Boughton; Nicholas J. Walton, Frodsham, all of Great Britain

[73] Assignee: Imperial Chemical Industries PLC, London, England

[21] Appl. No.: 542,831

[22] Filed: Jun. 25, 1990

[30] Foreign Application Priority Data

Jun. 24, 1989 [GB] United Kingdom ............... 8914575

[51] Int. Cl.$^5$ .............................. C08F 4/72
[52] U.S. Cl. .................. 502/158; 502/150; 502/162; 502/164; 502/167; 502/168; 502/171; 556/19; 556/20; 556/70; 556/87; 556/404; 556/410
[58] Field of Search ............. 502/150, 158, 162, 164, 502/167, 168, 171; 556/19, 20, 70, 87, 404, 410

[56] References Cited

U.S. PATENT DOCUMENTS 2,876,234 3/1959 Hurwitz et al. .................. 556/411
4,115,427 9/1978 Kotzsch et al. .................. 556/410

Primary Examiner—Patrick P. Garvin
Assistant Examiner—Brent M. Peebles
Attorney, Agent, or Firm—Cushman, Darby & Cushman

[57] ABSTRACT

A catalyst for addition polymerization comprising
(a) an (initiator) first component comprising a plurality of atoms M as hereinafter defined, each in a moiety of formula (I):

$$MX(Y_n)Z_p \qquad (I)$$

wherein

M is Si, Ge or Sn
n is 0 or an integer, and p is an integer such that $(n+p)=3$;
X is a diradical

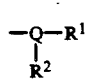

bound via Q to M
where
Q is N, P, As or P(=T)G.D where T is O or S and G and D are each independently a bond, O or S,
$R^1$ is optionally substituted hydrocarbyl, or, when Q is P, $M(Y_n)Z_p$ as herein defined,
$R^2$ is optionally substituted hydrocarbadiyl, or
$R^1$ and $R^2$ together are hydrocarbatriyl,
all such $R^1$ and $R^2$ being inert in the conditions of the process of the present invention; and
$R^2$ being linked directly or indirectly to any group as defined for X, or an organic radical comprising further moieties of formula (I), or one or more $M(Y_n)Zp$ moieties as herein defined; and
Y and Z are each independently any group A or OA where A is optionally substituted hydrocarbyl inert in the conditions of the process of the present invention, or Y is optionally substituted trialkylsilylalkyl; and
(b) a (co-catalyst) second component salt comprising an anion selected from azide, cyanide, cuanate, fluoride, bifluoride, nitrate and optionally substituted organic mono- and poly-phosphonates, -phosphinates -sulphonates, -sulphinates, -carboxylates, -siloxides and -oxides; and a cation which in use of the catalyst is inert under the polymerization process conditions yet renders the cocatalyst available in the polymerizing medium; initiator components for such catalysts, compositions comprising such components, and a polymerization process, in particular the addition polymierization of vinylic monomers, using the catalysts.

9 Claims, No Drawings

CATALYSTS

This invention relates to polymerisation catalysts, in particular to catalysts for addition polymerisation, in particular of vinylic monomers, to initiator components for such catalysts, to compositions comprising such components, and to a polymerisation process, in particular the addition polymerisation of vinylic monomers, using the catalysts. (The term "polymerisation" herein includes all types of polymerisation, including homo- and co-polymerisation, and the term "monomer" herein includes a reference to homo- and co-oligomers).

It is desirable to be able to produce high molecular weight polymers in catalysed addition polymerisation, in particular of vinylic (including acrylic) monomers, with a narrow molecular weight distribution.

It is also desirable to be able to achieve the bulk polymerisation of such monomers.

However, hitherto this has been difficult to achieve, especially in the case of acrylics, owing to the tendency of known catalysed systems to suffer from an excessive and uncontrollable reaction exotherm, and most polymerisations of this type have therefore disadvantageously had to be carried out in solution.

We have found that the catalysts of this invention may be used advantageously to produce high molecular weight polymers with a narrow molecular weight distribution, and especially in some cases for controlled bulk polymerisation of vinylics, in particular of acrylics.

Accordingly, the present invention in a first aspect provides a catalyst for addition polymerisation comprising (a) an (initiator) first component comprising a plurality of atoms M as hereinafter defined, each in a moiety of formula (I):

wherein
M is Si, Ge or Sn
n is O or an integer, and p is an integer such that $(n+p)=3$;
X is a diradical

bound via Q to M
where
Q is N, P, As or P(=T)G.D where T is O or S and G and D are each independently a bond, O or S,
$R^1$ is optionally substituted hydrocarbyl, or, when Q is P, $N(Y_n)Z_p$ as herein defined.
$R^2$ is optionally substituted hydrocarbadiyl, or
$R^1$ and $R^2$ together are hydrocarbatriyl,
all such $R^1$ and $R^2$ being inert in the conditions of the process of the present invention; and
$R^2$ being linked directly or indirectly to any group as defined for X, or an organic radical comprising further moieties of formula (I), or one or more $M(Y_n)Z_p$ moieties as herein
Y and Z are independently any group A or OA where A hydrocarbyl inert in the conditions of the process of the present invention, or Y is optionally substituted trialkylsilylalkyl; and (b) a (co-catalyst) second component salt comprising an anion selected from azide, cyanide, cyanate, fluoride, bifluoride, nitrate and optionally substituted organic mono- and poly-phosphonates, -phosphinates -sulphonates, -sulphinates, -carboxylates, -siloxides and -oxides; and a cation which in use of the catalyst is inert under the polymerisation process conditions yet renders the co-catalyst available in the polymerising medium.

The anions from which the anion of component b) is selected include aliphatic and aromatic organic anions which are optionally substituted by electron withdrawers, such as cyano, halo including fluoro and chloro, and nitro in aromatic moieties).

The cation may render the catalyst available inter alia by rendering it soluble to an extent which renders the use of the catalyst practicable.

In the (initiator) first component a) of the catalyst and compositions of the initiator:

$R^2$ may be linked directly or indirectly to any group as defined for X, or an organic radical comprising further moieties of formula (I). When $R^2$ in each moiety of the formula (I) is linked indirectly to another group as defined for X, it may be linked via an alkylene-containing chain, or via an O or C atom of an alkyleneoxy-containing group.

Suitable groups therefor comprise $C_{2-8}$ straight chain alkylene, in particular 1,6-hexylene.

When $R^2$ is linked to an organic moiety, the latter may be a polymer. (The term "polymer" includes a reference to oligomers. The term in particular includes polymers of vinylic monomers.) $R^2$ may be linked to such a polymer (including oligomer) backbone either directly or via an alkylene-containing chain, or via an O or C atom of an alkyleneoxy-containing group.

Suitable groups therefor comprise alkylene of the type described below for $R^2$, including $C_{1-4}$ straight chain alkylene, in particular methylene and ethylene.

Favoured M is Si.

The term "optionally substituted" herein in relation to X, Y and Z groups includes substitution by pendent mono- or di-valent groups.

In relation to X only, it also includes substitution by hetero-atoms, e.g. N.

It will be appreciated that, although bonds between M and at least one of X, Y or Z break in the catalytic process of the present invention, the groups themselves should be inert in the process conditions.

Unsubstituted hydrocarbyl, hydrocarbadiyl or hydrocarbatriyl, including all such $R^1$ and $R^2$ groups, and the same substituted by hetero-atoms, such as N, will all be inert in the conditions of the process of the present invention.

Such groups which are substituted and also inert in the conditions of the process of the present invention include such groups substituted by: electron withdrawers such as oxo in aliphatic moieties, cyano, halo including chloro and fluoro, in and nitro in aromatic moieties, and electron donors such as alkoxy and amino substituted by aliphatic substituents, such as alkyl and cycloalkyl.

Such groups may be optionally substituted by a combination of such hetero-atom and/or pendent substituents, e.g. by oxo and N or substituted amino such that the group comprises a carbamoyl function, or by oxo and alkoxy such that the group comprises an alkoxycarbonyl function.

Within X (i.e. $QR^1R^2$ as hereinbefore defined), Q is often N, P, P=O or O—P(=O)—O, in particular N and P.

Suitable $R^1$ optionally substituted hydrocarbyl include optionally substituted alkyl and cycloalkyl (including polycycloalkyl).

Suitable $R^1$ optionally substituted hydrocarbyl also include optionally substituted alkenyl and cycloalkenyl.

Suitable $R^1$ optionally substituted hydrocarbyl further include optionally substituted aryl, aralkyl and aralkenyl.

Suitable $R^1$ optionally substituted alkyl and such alkyl as a component within $R^1$ include optionally substituted $C_{1-6}$ alkyl, unsubstituted by hetero-atoms, and a preferred group of such alkyl groups for $R^1$ includes methyl and ethyl, especially methyl.

In a second preferred group, when Q is N or P, such $R^1$ include optionally further substituted α-oxo-substituted alkyl, i.e. optionally substituted carboxylic acyl, for example such $C_{1-4}$ alkanoyl, in particular substituted 2-methylpropionyl, acetyl and formyl.

Formyl may be substituted by alkoxy, such as isopropoxy and ter.-butoxy. The corresponding groups $R^1$ will be isopropoxycarbonyl and tert.-butoxycarbonyl.

Such $R^1$ groups may also favourably be aza-substituted β to the Q nitrogen atom, so that X comprises a ureido group. For example 2-methylpropionyl may be substituted by N. Such $R^1$ groups may also favourably be substituted by substituted amino such as amino substituted by aliphatic substituents, such as alkyl or cycloalkyl, again so that X comprises a ureido group. For example formyl may be substituted by substituted amino such as amino substituted as above.

In both cases the corresponding group $R^1$ will comprise a carbamoyl moiety, e.g. dimethylcarbamoyl.

Suitable $R^1$ optionally substituted cycloalkyl include such $C_{5-8}$ cycloalkyl, for example cyclohexyl, and polycycloalkyl, which are often unsubstituted.

Suitable $R^1$ optionally substituted alkenyl and such alkenyl as a component within $R^1$ include optionally substituted $C_{2-4}$ alkenyl, in particular methyl-prop-1-enyl (methallyl).

Suitable $R^1$ optionally substituted cycloalkenyl include such $C_{5-8}$ cycloalkenyl, for example cyclohex-1-enyl, especially when Q is N. Such cycloalkenyl groups are often unsubstituted.

Suitable $R^1$ optionally substituted aryl include phenyl optionally substituted by substituents inert in the desired polymerisation conditions, which include alkyl and aryl. Such aryl groups are however often unsubstituted.

Suitable $R^1$ optionally substituted aralkenyl include the above suitable alkenyl groups substituted by the above suitable aryl groups, and thus include 2-methyl-1-phenylprop-1-enyl (phenylmethallyl). Such groups are often unsubstituted in the phenyl ring.

Suitable $R^1$ optionally substituted aralkyl groups include the above suitable alkyl groups substituted by the above suitable aryl groups, and thus include benzyl, often unsubstituted in the phenyl ring.

Suitable $R^2$ optionally substituted hydrocarbadiyl include optionally substituted alkanediyl and cycloalkanediyl (including polycyclo- alkanediyl).

Suitable $R^2$ optionally substituted hydrocarbadiyl also include alkenediyl and cycloalkenediyl.

Suitable $R^2$ optionally substituted hydrocarbadiyl further include arylene.

Suitable $R^2$ optionally substituted hydrocarbadiyl also include diradical combinations of the foregoing diradicals, such as arylenealkyl, aralkanediyl, arylenealkenyl and aralkenediyl.

Suitable $R^2$ optionally substituted alkanediyl include optionally substituted $C_{1-4}$ alkanediyl, in particular methylene, ethylene and propylene. Two corresponding $MX(Y_n)Z_p$ moieties may be joined by their $R^2$ (e.g. propylene) groups to give a present catalyst component a) in which the two M atoms are bridged by an alkylene (e.g. 1,6-hexylene) moiety.

When Q is N or P, such $R^2$ groups include alkanediyl which is oxo-substituted α to Q and α,ω-dioxo-substituted alkanediyl, all optionally inertly substituted.

Such $R^2$ groups may also favourably be aza-substituted β to the Q nitrogen atom, so that X comprises a ureido group. For example, $R^2$ propane-1,2-diyl may be so substituted to comprise an N-methylcarbamoyl group, with a free valency to the N atom.

Two corresponding $MX(Y_n)Z_p$ moieties may be joined by their $R^2$ groups by $C_{2-8}$ straight chain alkylene, in particular 1,6-hexylene, to give a present catalyst component a) in which the two M atoms are bridged by a hexylene-1,6-bis(N-methylcarbamoyl) moiety.

Suitable $R^2$ optionally substituted cycloalkanediyl include such $C_{5-8}$ cycloalkanediyl.

Examples include cyclohexane-1,4-diyl. Such cycloalkanediyl groups are often unsubstituted.

Optionally substituted alkenediyl as $R^2$ and as a component within $R^2$ includes optionally substituted $C_2$-alkenediyl, in particular 2-methylprop-1-ene-1,3-diyl.

Suitable $R^2$ optionally substituted cycloalkenediyl include such $C_{5-8}$ cycloalkenediyl, e.g. cyclohex-1-ene-1-4-diyl, especially when Q is N, and polycycloalkenediyl, which are often unsubstituted.

Suitable $R^2$ optionally substituted arylene include phenylene optionally substituted by substituents inert in the conditions of the process of the present invention, which include alkyl and aryl. Such aryl groups are however often unsubstituted.

Suitable $R^2$ optionally substituted arylenealkyl and such arylenealkyl as a component within $R^2$ include the above suitable alkenediyl groups substituted by the above suitable arylene groups, and thus include optionally substituted phenylenemethyl. They are more often unsubstituted.

Suitable $R^2$ optionally substituted aralkenediyl include the above suitable alkenediyl groups substituted by aryl groups corresponding to the above suitable arylene groups. They are more often unsubstituted.

In particular when Q is N, $R^1$ and $R^2$ together may be optionally substituted hydrocarbatriyl.

In one group, such $(R^1+R^2)$ are unsubstituted by hetero-atoms.

In a second group, such $(R^1+R^2)$ are substituted by hetero-atoms other than nitrogen.

In a third group, such $(R^1+R^2)$ are unsubstituted by pendent monovalent substituents.

In a fourth group, such $(R^1 +R^1)$ have one or two saturated carbon atoms α to Q. and in particular also c to vinylic unsaturation, substituted by oxo groups.

For all values of Q:

Suitable, favoured and preferred $(R^1+R^2)$ are generally as so described for corresponding $R^2$ hereinbefore.

Suitable $(R^1+R^2)$ include optionally substituted alkanetriyl and cycloalkanetriyl (including polycycloalkenetriyl).

Suitable $(R^1+R^2)$ also include optionally substituted alkenetriyl, alkapolyenetriyl and cycloalkenetriyl.

Suitable ($R^1 + R^2$) further include optionally substituted arenetriyl.

Suitable ($R^1 + R^2$) optionally substituted hydrocarbatriyl also include triradical combinations of the foregoing triradicals, such as arenetriylalkyl, arylenealkanediyl, arenetriylalkenyl, arylene-alkenediyl, arenetriylcycloalkyl, and arylenecycloalkanediyl.

Suitable ($R^1 + R^2$) optionally substituted alkanetriyl include $C_{3-6}$ alkanetriyl optionally substituted by at least one hetero-atom or -group such as O, S or $NR^3$ where $R^3$ is independently a bond, any of the values of $R^1$, or independently another group $M(Y_n)Z_p$ as hereinbefore defined.

Corresponding $QR^1R^2$ groups thus include moieties comprising 4 to 7-member heterocyclic groups, such as pyrrolidine-1,3-diyl, piperidine-1,4-diyl and piperazine-1,4-diyl, and phospha-analogues thereof. Such groups are often not further substituted.

When Q is N, such ($R^1 + R^2$) groups include similarly optionally substituted, α-oxo- or α,ω-dioxo-substituted alkanetriyl, i.e. $QR^1R^2$ may comprise a 4 to 7-member lactamido or cycloimido group, all optionally inertly substituted.

Such $R^2$ groups may also favourably be aza-substituted β to the Q nitrogen atom, so that X comprises a cyclic ureido group. For example, ($R^1 + R^2$) 1,4-butylene may be so substituted to give rise to an X group which is imidazolidine-2,4- dione-1,3-diyl.

Two corresponding $MX(Y_n)Z_p$ moieties may be joined by their $R^2$ groups by $C_{2-8}$ straight-chain alkylene, in particular 1,6-hexylene, to give a present catalyst component a) in which the two M atoms are bridged by a hexylene-1,6-bis(imidazolidine-2,4-dion-1,3-diyl) moiety.

Other such ($R^1 + R^2$) moieties are those comprising pyrrolid-2-one-1,4-diyl, piperazine-2,5-dione-1,4-diyl and piperid-2-one-1,4-diyl groups.

All such groups are often not further substituted.

Suitable ($R^1 + R^2$) optionally substituted alkenetriyl and alkapolyenetriyl include $C_{4-6}$ alkenetriyl, α,ω-$C_{4-6}$ alkadienetriyl and hexatrienetriyl optionally substituted by at least one hetero-atom or group, such as O or S, or $NR^3$ where $R^3$ is independently a bond, any of the values of $R^1$.

Corresponding $QR^1R^2$ moieties thus include moieties comprising 5- to 7- member unsaturated heterocyclodiyl groups, which are optionally alkylene-substituted.

These include moieties comprising pyrrole-1,3-diyl, pyrroline-1,3-diyl, imidazole-1,3-diyl and imidazoline-1,3-diyl groups, in particular imidazole-1,3-diyl groups. Such groups are often not further substituted.

Such optionally substituted α-oxo- or α,ω-dioxo-substituted alkenetriyl may be oxa-substituted, i.e. $QR^1R^2$ may comprise an oxa-substituted heterocyclodiyl group, e.g. O-substituted, such as oxazolid-2-one-3,5-diyl.

Suitable ($R^1 + R^2$) optionally substituted arenetriyl moieties include biphenyl-2,k,2'-triyl, where k is an integer between 3 and 6, optionally substituted as for $R^1$ aryl.

Corresponding $QR^1R^2$ moieties thus include optionally substituted u-9-carbazolediyl, where u is 1 or 2, and its phospha analogue.

If any arene moiety therein is substituted, suitable substituents include alkyl, e.g. optionally substituted $C_{1-4}$ alkyl, in particular methyl. Such arene groups are often unsubstituted.

Two corresponding $MX(Y_n)Z_p$ moieties may be joined by their $R^2$ groups by $C_{2-8}$ straight chain alkylenedioxy, in particular 1,6-hexylenedioxy, to give a present catalyst component a) in which the two M atoms are bridged by a hexylene-1,6-bis(9-carbazole-u-oxy-9-yl) moiety.

Suitable ($R^1 + R^2$) optionally substituted arenetriylalkyl and arylenealkanediyl groups include combinations of the above corresponding suitable aromatic and aliphatic groups.

The former thus include groups composed of a 1,2,k-arenetriyl group, e.g. biphenyl-2,k,2'-triyl, where k is integer between 3 and 6, and an α,ω-$C_{2-4}$ alkanediyl, and the latter include groups composed of a 1,2-arylene moiety and a $C_{2-4}$ alkanetriyl moiety, where any of the aliphatic moieties may be α-oxo-substituted.

If any arene moiety in such a group is substituted, suitable substituents include alkyl, e.g. optionally substituted $C_{1-4}$ alkyl, in particular methyl. Such arene groups are often unsubstituted.

Corresponding $QR^1R^2$ moieties thus include those comprising benzo-fused 5- to 7-member saturated heterocyclic groups, such as N-indanyl and N-indan-2-onyl, often unsubstituted, with a second bond to either ring, and phospha analogues thereof.

Suitable ($R^1 + R^2$) optionally substituted arenetriylalkenyl and arylenealkenediyl groups include combinations of the above corresponding suitable aromatic and unsaturated aliphatic groups.

The former thus include such groups composed of a 1,2,k-arenetriyl moiety, where k is an integer between 3 and 6, and an α,ω-$C_{2-4}$ alkenediyl, and the latter include such groups composed of a 1,2-arylene moiety and a $C_{2-4}$ alkenetriyl moiety. In both cases, the aliphatic moieties may be α-oxo-substituted.

Corresponding $QR^1R^2$ moieties thus include moieties comprising benzo-fused 5- to 7- member unsaturated heterocyclic groups, such as N-indolyl, often unsubstituted, with a second bond to either ring, and its phospha analogue.

Suitable ($R^1 + R^2$) optionally substituted arenetriylcycloalkyl and arylenecycloalkanediyl moieties include, in the former case, moieties composed of a 1,2-k-arenetriyl moiety, where k is an integer between 3 and 6, and a 1,2-$C_{2-4}$ cycloalkanediyl.

In the latter case, they include moieties composed of a 1,2-arylene moiety and a $C_{2-4}$ cycloalkanetriyl moiety, where the aliphatic moieties may be α-oxo-substituted.

Corresponding $QR^1R^2$ moieties thus include moieties comprising benzo-fused heteropolycyclics, such as 1,2,3,4-tetrahydro-u,9-carbazolediyl, where u is 1 or 2, and its phospha analogue. Such groups may be substituted in the arene moiety by alkyl but are often unsubstituted.

Suitable Y and Z groups A groups within Y and Z include those recited for monovalent $R^1$ hereinbefore.

Suitable Y, Z and A alkyl groups include include $C_{1-20}$ alkyl groups, such as $C_{1-8}$ alkyl groups.

Suitable $C_{1-8}$ alkyl groups include favoured straight-chain $C_{1-4}$ alkyl groups, e.g. methyl and ethyl, in particular methyl.

They also include branched $C_{4-8}$ alkyl groups, in particular those with a high degree of branching, e.g. optionally substituted (but often unsubstituted) neopentyl.

Suitable Y and Z alkoxy groups include $C_{1-4}$ alkoxy, e.g. methoxy and ethoxy, e.g. ethoxy.

Suitable Y, Z and A cycloalkyl groups include $C_{4-7}$ cycloalk, thus including cyclohexyl, and polycycloalkyl, in particular adamantyl.

Suitable Y and Z optionally substituted cycloalkoxy groups thus include $C_{4-7}$ cycloalkoxy, thus including cyclohexyloxy, any of which may be $\alpha$-oxo or $\alpha,\omega$-dioxo substituted.

Within Y, Z and A aryl and aralkyl groups, favoured optionally substituted aryl groups include optionally substituted phenyl and 1-naphthyl.

Suitable substituents for such aryl groups are substituents inert in the desired polymerisation conditions provided the conjugate protic acid of such aryl groups has a $pK_a$ in DMSO <18. Such groups will be readily apparent to the skilled man, but include alkyl and aryl groups, and exclude carbonyl-containing ones. Such aryl groups are often unsubstituted.

Suitable Y and Z optionally substituted aryloxy groups thus include optionally substituted phenoxy.

Within Y, Z and A aralkyl groups, favoured alkyl groups include $C_{1-4}$ alkyl, in particular methyl.

Favoured Y and Z aralkyl groups thus include phenyl $C_{1-4}$ alkyl, in particular benzyl. Such groups are optionally substituted in the phenyl ring, but are often unsubstituted. Suitable substituents include those listed above for Y and Z aryl groups.

Favoured Y and Z aralkoxy groups include phenyl-$C_{1-4}$ alkoxy, e.g. benzyloxy, optionally substituted in the phenyl ring. Suitable substituents include those listed above for Y and Z aryl groups.

As noted hereinbefore, $R^2$ in each moiety of the formula (I) may be linked to the rest of the initiator, whether another moiety of the formula (I) or a polymer (including oligomer) backbone, either directly or via an alkylene-containing chain, or via an O or C atom of an alkyleneoxy-containing group.

Also as noted hereinbefore, suitable groups therefor comprise alkylene of the type described above for $R^2$, including $C_{1-4}$ straight chain alkylene, in particular methylene and ethylene.

Where it is joined to a polymer (as hereinbefore defined), the polymer is preferably a particulate one insoluble in any desired polymerisation system) for example a highly-cross-linked polymer with the moieties of formula (I) as hereinbefore defined on its surface).

Preferably the polymer is a solid granulate of relatively high surface area, for example in the range 200 to 600 m²/gm, favourably with a concentration of formula (I) as hereinbefore defined on its surface of 1 per 3 to 30 square Angstrom.

Depending on the polymerisation medium, highly cross-linked alkylene, arylene, acrylic or styrene homo- or copolymers may be appropriate for such polymers in a corresponding initiator comprising a plurality of moieties of formula (I).

Favoured anions in the co-catalyst second catalyst component include azide, cyanide, cyanate, fluoride, bifluoride and aliphatic and aromatic mono-sulphonates.

Such anions include in particular fluoride, bifluoride and methanesulphonate ions.

Favoured cations therein, which render the catalyst available in the polymerisation medium, are often substituted -onium ions. These include quaternary ammonium and phosphonium, and tris(dialkylamino)-sulphonium, often substituted by relatively bulky organic-soluble groups e.g. $C_{3-6}$ alkyl, such as butyl, or $C_{5-8}$ cycloalkyl.

Alkali and alkali earth metal cations are less preferred but may be used if, in addition to the cations of the second catalyst component, the catalyst also includes a solubilisation aid, for example a crown ether, to complex the cations in the second component.

Typically the catalyst may comprise the first and second components in molar ratios in the range of 300:1 to 3:1 more often 100:1 to 8:1.

Where, for example, a crown ether is present this will of course be present in an appropriate molar ratio to the second component, for example in the range of 0.3:1 to 3:1.

In a second aspect the present invention provides an initiator component a) of formula (I) for the catalyst of the first aspect of the invention.

A group of catalyst first (initiator) components consists of those of formula (II).

wherein
y is 0 or 1 when w is 2, and 1 when w is 3 to 10;
$\Omega$ is a w-valent organic radical; and
Y and Z are as defined hereinbefore.
w is preferably 2 to 5.

Suitable, favoured and preferred X, Y and Z are as so described for relevant X, Y and Z hereinbefore.

Suitable, favoured and preferred groups X in formula (II) include respectively any of the groups $QR^1R^2$ composed of those variable Q, $R^1$ or ($R^1+R^2$) correspondingly described as suitable, favoured or preferred hereinbefore.

In one sub-group of the components of formula (II), w is 2, so that the compound of formula consists of two moieties of formula (I) joined via their respective $R^2$ groups, either directly or via an alkylene or alkylenedioxy bridge. In the former case y is 0. In the latter case y is 1, and $\Omega$ is alkylene or alkylenedioxy, so that the bridge is suitably $C_{2-8}$ alkylene or $C_{2-8}$ alkylenedioxy.

In a second sub-group, w is 3 to 5, so that the compound of formula consists of w moieties of formula (I) joined via their respective $R^2$ groups, directly or via e.g. an alkylene or oxyalkylene bridge to a 3- to 5-valent organic (e.g. oligomer) moiety.

In this case y is of course 1, and $\Omega$ is often a 3- to 5-oligomer corresponding to the appropriate polymers for the initiator components described hereinbefore. Each $R^2$ may also be alkylene- or arylene-carbonyl linked to a similar oligomer chain.

Particular first components, within a third preferred sub-group within formula (II), are those in which, within X, Q is N and
$R^2$ is alkanediyl including $\alpha,\omega$-$C_{1-4}$ alkanediyl optionally substituted by at least one hetero-atom or -group and $\alpha$-oxo- or $\alpha,\omega$-dioxo-substituted, so that this sub-group includes compounds in which $QR^1R^2$ is acyclic and comprises a ureido function; or ($R^1+R^2$) is similarly optionally substituted alkanetriyl, i.e. so that this sub-group includes compounds in which $QR^1R^2$ comprises a 4 to 7 member cyclic urea.

Values of X within compounds of this sub-group include diradicals corresponding to N-alkyl-$N^1$-alkylureido, such as N-methyl-$N^1$-methylureido, N,$N^1$-dialkylureido, such as N,N-dimethylureido, and N-aryl-$N^1$-alkylureido, such as N-phenyl-$N^1$-methylureido, and 1,3-diaza-2-oxo-heterocycles, such as imidazolidine-2,4-dione-1,3-diyl. Each $R^2$ may also be arylenecarbonyl (the carbonyl being $\alpha$ to Q=N).

Particular first components, within a fourth preferred sub-group within formula (II), are those in which, within X, Q is N and (R¹+R²) is optionally substituted arenetriyl. In such (R¹+R²) optionally substituted arenetriyl groups, favoured groups include optionally substituted biphenyltriyl, such as biphenyl-2,k,2'-triyl, where k is 3 to 6.

Corresponding QR¹R² groups thus include u,9-carbazolediyl, where u is 1 or 2. Such groups may be substituted (when substituents include those listed above for such X groups), but are often not.

A second group of catalyst first (initiator) components consists of those of formula (III):

  (III)

wherein a is an integer greater than 10;

$\pi$ is an a-valent organic polymer radical; and the remaining variables are as defined in formula (II).

Suitable, favoured and preferred variables are as so described for corresponding variables in formula (II).

Within the components of formula (III) are two preferred sub-groups defined by X and its component groups and corresponding to the third and fourth preferred sub-groups within those of formula (II).

a is preferably 11 to 100,000, in particular 11 to 3,000.

Depending on the polymerisation medium in which the initiator component is to be used, $\pi$ may appropriately be a highly cross-linked alkylene, arylene, acrylic or styrene homo- or co-polymer.

$\pi$ is preferably a solid granulate of such a polymer with the moieties of formula (II) on its surface at a concentration of 1 per 3 to 30 Å², and with a specific surface area of 200 to 600 m²/gm.

For some values of $\Omega$, and largely independently of X, initiator components of formula (II) will tend to be soluble or dispersible in desired polymerisation systems.

All the initiator components may be used as such, or they may be formulated into compositions with other materials (in particular in the foregoing case where it is desired to avoid solution or dispersion of the initiator, when they may be formulated into insoluble or non-dispersible compositions), e.g. with such conventional materials as catalyst supports.

Such compositions are of use in the catalysts of addition polymerisation, e.g. of vinylic monomers, and also (desirably) in order to be able to achieve the bulk polymerisation of such monomers. They form a third aspect of the present invention.

Compositions comprising a component a) of formula (II) form a favoured group of such compositions, and preferred and particular compositions include those which comprise a component a) described as preferred or particular hereinbefore.

Where such a composition is insoluble it may be seen as an alternative to insoluble forms of the initiator component itself. The initiator component in such a composition is often adhered to or embedded in the surface of a support (rather than chemically bonded it as hereinbefore).

The support may comprise an insoluble polymer, e.g. a highly cross-linked acrylic or styrene homo- or copolymer, preferably a particulate one.

Any co-catalyst component b) which in use of the catalyst is available in the polymerisation process as described hereinbefore is suitable for use with the present compositions.

In a fourth aspect the present invention provides an addition polymerisation process catalysed by a catalyst of the first aspect of the invention. The process may be the polymerisation of vinylic monomers (including oligomers), in particular bulk homo- or co-polymerisation, especially of acrylic monomers or oligomers. Named monomer species hereinafter include a reference to homo- and co-oligomers of those monomer species.

The catalysts and compositions of the present invention are used in conventional manner in such a process.

The process may be carried out using a number of different embodiments of the catalysts of the first aspect of the invention.

Thus, for example, in a first embodiment both the initiator component a) and the co-catalyst component b) may be soluble in a monomer to be polymerised and/or in a reaction vehicle.

In a second embodiment the initiator a) may be in an insoluble form, such as one of those initiators which comprises an insoluble organic polymer; or the initiator may be comprised in an insoluble composition such as a conventional insoluble catalyst support. All such insoluble forms are described hereinbefore.

Under the polymerisation process conditions the co-catalyst b) must be available to effect polymerisation in the polymerisation medium and this often means it must be soluble in at least one liquid monomer species, in a solvent compatible with the monomer(s) and inert in the present process conditions and/or, in phase which contains at least one monomer species to such an extent that it can catalyse the reaction adequately.

Thus, in bulk polymerisations, if the co-catalyst is not soluble in a monomer, an inert solvent compatible with the monomer(s) may be used, but just in sufficient quantities to dissolve the co-catalyst.

Examples of suitable inert solvents or vehicles (if desired) include ether solvents such as dimethyl ether, diethyl ether, dimethoxyethane, diethoxyethane, diethyleneglycol dimethyl ether or tetrahydrofuran; and hydrocarbon solvents such as benzene, toluene or xylene. The ether series of solvents are preferred amongst such solvents.

In general such liquids should not contain labile hydrogen or halogen atoms or activated alkenyl groups.

The initiator which forms component a) is generally used in an amount corresponding to a molar ratio of 1:10 and generally less, and preferably 1:1000 to 1:50 relative to the monomer(s) except where the initiator comprises an insoluble polymeric solid (e.g. it is of formula (III) as hereinbefore defined), when the initiator is generally used in an amount corresponding to a molar ratio of 1:100 to 1:5 relative to the monomer(s). As noted hereinbefore, the ratio of initiator a) to co-catalyst b) is generally in the molar ratio range of 300:1 to 3:1, more often 100:1 to 8:1, i.e. the co-catalyst is generally used at a molar ratio to monomer of 1:300,000 to 1:400. The ratio of initiator to co-catalyst is given hereinbefore.

Polymerisation reactions of this invention may be conducted, for example, at temperatures ranging from −100° C. to 150° C.; a range of −20° to 60° C. is preferable., or −100° to 30° C. in the case of bulk polymerisation.

These processes may be conducted under 0.1 to 50 atmospheres pressure but normally atmospheric pressure is suitable.

The present process should be conducted under anhydrous conditions, and the water content of the monomers, polymerisation initiators and co-catalysts and any solvents minimised in order to obtain high molecular weight polymers by this method.

It is desirable to ensure that processes of this invention are conducted in atmospheres that have been dried in order to prevent the penetration of any water.

Such atmospheres would include dry air, or 774 atmospheres of dried inert gases such as nitrogen or argon; dried inert gas atmospheres are preferable.

No particular restrictions are placed on the order of addition of various components of the reaction system.

Thus, the polymerisation initiator, a) or a composition comprising it, co-catalyst b) and monomer may be added in any sequence to the reaction system in the present process, which proceeds whatever sequence is used.

For example, the catalyst components may be mixed and added to the monomer. However, in terms of being able to control the polymerisation reaction easily, especially in the bulk polymerisation of acrylics, it is desirable to add the initiator a) or composition comprising it and co-catalyst b) separately to the monomer, or to add one catalyst component to the monomer or vice versa and add the product mixture to the other catalyst component, or vice versa.

Thus, where the initiator and co-catalyst are both soluble in a solvent in which the monomer is also soluble, it is often desirable to add the initiator and co-catalyst b) separately to the monomer or a solution thereof.

Initiator a) or co-catalyst b) added to the reaction mixture should normally be added neat, or in the form of a solution in tetrahydrofuran or the same organic solvent as any used in the polymerisation reaction. Often the initiator is added first to the monomer.

Further monomer (the same as or different from the initial monomer) may be added in the second mixing step.

If block copolymers are to be prepared by a solution process of this invention using two or more monomers, after initially polymerising the first monomer using an initiator and co-catalyst, the second monomer is generally added to the initial product polymer solution in solution in a suitable organic solvent, which is normally the same throughout.

Any vinylic monomer in which the olefinic moiety is not substituted by any functional group possessing acidic hydrogen atoms may be polymerised in the present process.

Typical examples of vinylic monomers without such functional groups include:

methacrylic acid esters such as methyl methacrylate, ethyl methacrylate, propyl methacrylate, butyl methacrylate, 2-ethylhexyl methacrylate, lauryl methacrylate, tricyclo[5,2,1,0$^{2,6}$]dec-3-en-8-yl methacrylate;

polyunsaturated methacrylic acid esters such as glycidyl methacrylate, triethyleneglycol dimethacrylate and allyl methacrylate;

acrylic acid esters such as methyl acrylate, ethyl acrylate, isopropyl acrylate, n-butyl acrylate, sec-butyl acrylate, tert-butyl acrylate and cyclohexyl acrylate;

unsaturated nitriles such as methacrylonitrile and acrylonitrile;

N,N-dialkyl unsaturated amides such as N,N-dimethylacrylamide; and aromatic vinyl compounds such as styrene, o-, m- or p-methylstyrene, α-, m- or p-methoxystyrene, or m- or p-chlorostyrene.

Preferred amongst these monomers are methyl methacrylate, lauryl methacrylate, butyl methacrylate, 2-ethylhexyl methacrylate and tricyclo[5,2,1,0$^{2,6}$]-dec-3-en-8-yl methacrylate, acrylonitrile, styrene, methyl acrylate, butyl acrylate, methacrylonitrile, α-methylstyrene and p-chlorostyrene, in particular methyl methacrylate, lauryl methacrylate, 2-ethylhexyl methacrylate, tricyclo[5,2,1,0$^{2,6}$]dec-3-en-8-yl methacrylate, butyl acrylate and acrylonitrile.

These monomers may be used singly or in combination.

The co-catalyst components b) are known materials.

The initiator components a) are preparable analogously to, or are routinely derivable, from known materials. For example many of the groups X, Y and Z may be introduced to form the compounds of formula (I) by conventional nucleophilic displacement at the M nucleus with suitable corresponding moieties.

Such preparative methods include and are exemplified by the methods in the following Examples.

The synthesis of initiators and use of catalysts of the present invention is illustrated by the following Examples:

Examples 1 and 2—Preparation of Initiator
Components a) of General Formula MXZ$_3$ Example 1—Preparation of
1,6-bis(9-trimethylsilylcarbazol-2-yloxy)hexane (E.1)

To a solution of 1,6-bis(carbazol-2-yloxy)hexane (30 g) in dry THF (200 ml) was added butyllithium (56 ml; 1.6M in hexane). Once the butyllithium addition was completed, the solution was heated to reflux for 1.5 hours and then allowed to cool. Chlorotrimethylsilane (12 ml) was added dropwise to the cooled mixture and then heated to reflux for 4 hours. Toluene (150 ml) was added to the cool mixture which was then filtered to remove LiCl. The filtrate was collected and the solvent removed under vacuum leaving a crude gray compound. The crude product was further purified by vacuum distillation to give a white compound (E.1) in an 84% yield.

It could be further purified by recrystallisation in hexane.

The following compounds were prepared analogously from the corresponding diamine or diphosphine and chlorosilane:

| | |
|---|---|
| 1,6-bis(1-trimethylsilylimidazolid-2,4-dion-3-yl)hexane | (E.2) |
| 1,3-bis(phenyltrimethylsilylphosphino)propane | (E.3) |
| 1,6-bis(1-methyl-3-phenyl-3-trimethylsilyl-ureido)hexane | (E.11) |
| 1,6-bis(3,3-dimethyl-1-trimethylsilyl-ureido)hexane | (E.12) |
| 1,6-bis(N-isopropoxycarbonyl-N-trimethylsilyl-amino)hexane | (E.13) |

Example 2

The following compounds are prepared analogously from the corresponding diamine and chlorosilane:

| | |
|---|---|
| 1,6-bis(3-trimethylsilylimidazolyl)hexane | (E.4) |
| 1,6-bis(3-trimethylsilyloxazolid-2-onyl)hexane | (E.5) |
| 1,6-(N-trimethylsilyl-N-cylcohex-1-enyl- | (E.6) |

| | | | | |
|---|---|---|---|---|
| —continued | | | | |
| amino)hexane | | | | |
| 1,6-bis-(N-trimethylsilylpiperazino)hexane | | | | (E.7) |
| 1,6-bis(9-tribenzylsilylcarbazol-2-yloxy)hexane | | | | (E.8) |
| 1,6-bis(9-triethoxysilylcarbazol-2-yloxy)hexane | | | | (E.9) |

Example 3—Preparation of Initiator Components comprising Moieties of General Formula $MXZ_3$ where X is a Polymer Chain—Preparation of Poly(N-trimethylsilylacrylonitrile) (E.10)

Analogously to Example 1, acrylonitrile is N-lithiated, and the product treated with chlorotrimethylsilane to give the above monomer. The monomer is polymerised conventionally to the desired product.

Example 4—Polymerisation using Catalysts comprising above Initiator Components—In situ generation of catalyst by combining initiator and co-catalyst As noted hereinbefore a co-catalyst salt (second component) b) of the type of the present invention is not generally added to the initiator (first) component a) to form the catalyst before use, but the combination is generated in situ in the polymerisation medium, using components a) and b) in an appropriate mutual molar ratio as hereinbefore described.

The exact order of addition of all the components to the polymerisation medium will depend to some extent on the specific conditions, e.g. bulk or solution polymerisation, and on the vinylic monomers to be polymerised. The following conditions are typical for the bulk polymerisation of methacrylic and/or acrylic ester and acrylic nitrile monomers.

The following tetrahydrofuran solutions of co-catalysts were prepared:

(C.1) Tetrabutylammonium fluoride trihydrate, pre-dried under high vacuum and over $P_2O_5$, made up into 0.1M solution.

(C.2) Anhydrous tetrabutylammonium fluoride (Aldrich), made up into 1M solution, dried over $CaH_2$ overnight.

(C.3) Tetrabutylammonium methanesulphonate, made up into 0.1M solution.

(C.4) Tetrabutylammonium fluoride—hexamethylacetylacetone complex, made up into 0.1M solution.

To a solution of (E.1), initiator component a) (0.05 mmoles) in monomer, methyl methacrylate or ethyl acrylate (50 mmoles) under nitrogen was added (C.4).

After an induction period of 1.5 minutes, the exothermic polymerisation reaction took place.

The following tabulated reaction components were used analogously, with the following results for methyl methacrylate;

| initiator | co-catalyst, mmole × $10^{-3}$ dispersion | yield % | $M_n$ | M. Wt. |
|---|---|---|---|---|
| for methyl methacrylate; | | | | |
| (E.1) | (C.4) 1 | 90 | 110,000 | 1.4 |
| (E.1) | (C.1) 1 | 90 | 105,000 | 1.4 |
| (E.2) | (C.4) 5 | >90 | 93,000 | 1.9 |
| (E.2) | (C.1) 1 | >90 | 95,000 | 1.9 |
| (E.3) | (C.5) 5 | 87 | 131,000 | 2.1 |
| for ethyl acrylate; | | | | |
| (E.1) | (C.4) 1 | 90 | 85,000 | 2.0 |
| (E.2) | (C.4) 5 | 85 | 80,000 | 2.5 |

Initiators (E.4) to (E.13) and co-catalysts (C.1) to (C.4) may be used analogously with similar results.

Optionally complexed fluoride is a preferred anion in component b); however, azide, cyanide, cyanate, fluoride, bifluoride, and other aliphatic and aromatic monosulphonates are used analogously with similar results. Any cation which in use of the catalyst is inert may be used in place of the tetrabutyl ammonium TBA. cation, provided that it renders the co-catalyst as soluble in the reaction mixture as the TBA salt.

We claim:

1. A catalyst for addition polymerisation comprising
(a) an (initiator) first component comprising a plurality of atoms M as hereinafter defined, each in a moiety of formula (I):

$$MX(Y_n)Z_p \qquad (I)$$

wherein
M is Si, Ge or Sn
n is O or an integer, and p is an integer such that (n+p)=3;
X is a diradical

bound via Q to M
where
Q is N, P, As or P(=T)G.D where T is O or S and G and D are each independently a bond, O or S,
$R^1$ is optionally substituted hydrocarbyl, or, when Q is P, $M(Y_n)Z_p$ as herein defined,
$R^2$ is optionally substituted hydrocarbadiyl, or
$R^1$ and $R^2$ together are hydrocarbatriyl,
all such $R^1$ and $R^2$ being inert in the polymerisation conditions; and
$R^2$ being linked directly or indirectly to any group as defined for X, or an organic radical comprising further moieties of formula (I), or one or more $M(Y_n)Z_p$ moieties as herein defined; and
Y and Z are independently any group A or OA where A is optionally substituted hydrocarbyl inert in the polymerisation conditions, or Y is optionally substituted trialkylsilylalkyl; and
(b) a (co-catalyst) second component salt comprising an anion selected from azide, cyanide, cyanate, fluoride, bifluoride, nitrate and optionally substituted organic mono- and poly-phosphonates, -phosphinates -sulphonates, -sulphinates, -carboxylates, -siloxides and -oxides; and
a cation which in use of the catalyst is inert under the polymerisation process conditions yet renders the co-catalyst available in the polymerising medium.

2. A catalyst according to claim 1 wherein the first component a) is of formula (II):

$$[(Y_n)Z_pM—X—]_w—\Omega_y \qquad (II)$$

wherein
y is 0 or 1;
w is 2;
$\Omega$ is a divalent organic radical; and
Y and Z are as defined in claim 1.

3. A catalyst according to claim 2 wherein each $R^1$ is $C_{1-6}$alkyl, unsubstituted by hetero-atoms or dialkylcarbamoyl, and each $R^2$ is $C_{2-8}$ straight chain alkylene, unsubstituted by hetero-atoms which is linked directly to the other $R^2$, or each $R^1$ is phenyl and each $R^2$ is a diradical corresponding to N-alkylcarbamoyl which is linked indirectly to the other $R^2$ via an alkylene chain.

4. A catalyst according to claim 2 wherein each $QR^1R^2$ is u-9-carbazolediyl, optionally substituted by $C_{1-4}$ alkyl, and is linked indirectly to the other $QR^1R^2$ group via an O or C atom of an alkylenedioxy group.

5. A catalyst according to claim 2 wherein each $QR^1R^2$ is imidazolid-2,4-dion-1,3-diyl), and is linked indirectly to the other $QR^1R^2$ group via an alkylene group.

6. A catalyst according to claim 1 wherein the first component a) is of formula (II).

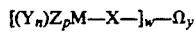  (II)

wherein
y is 1;
w is 3 to 10;
$\Omega$ is a w-valent organic polymer radical; and
Y and Z are as defined in claim 1.

7. A catalyst according to claim 1, wherein the anion of the co-catalyst component b) comprises fluoride or bifluoride.

8. A compound of formula (II):

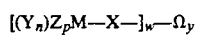  (II)

wherein:
y is 0 or 1;
w is 2;
$\Omega$ is a divalent organic radical; and
M is Si, Ge or Sn
n is 0 or an integer, and p is an integer such that (n+p)=3;
X is a diradical

bound via Q to M
where
Q is N, P, As or P(=T)G.D where T is O or S and G and D are each independently a bond, O or S,
$R^1$ is optionally substituted hydrocarbyl, or, when Q is P, $N(Y_n)Z_p$ as herein defined,
$R^2$ is optionally substituted hydrocarbadiyl, or $R^1$ and $R^2$ together are hydrocarbatriyl,
all such $R^1$ and $R^2$ being inert in the conditions of the polymerisation process of the present invention; and
Y and Z are independently any group A or OA where A is optionally substituted hydrocarbyl inert in the conditions of the polymerisation process of the present invention, or Y is optionally substituted trialkylsilylalkyl,
and in that the two $(Y_n)Z_pM—X—$ moieties are joined via their respective $R^2$ groups, either directly or via the organic radical $\Omega$.

9. A compound of formula (II):

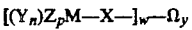  (II)

wherein:
y is 1;
w is 3 to 10;
$\Omega$ is a w-valent organic radical;
M is Si, Ge or Sn
n is 0 or an integer, and p is an integer such that (n+p)=3;
X is a diradical

bound via Q to M
where
Q is N, P, As or P(=T)G.D where T is O or S and G and D are each independently a bond, O or S,
$R^1$ is optionally substituted hydrocarbyl, or, when Q is P, $M(Y_n)Z_p$ as herein defined,
$R^2$ is optionally substituted hydrocarbadiyl, or $R^1$ and $R^2$ together are hydrocarbatriyl,
all such $R^1$ and $R^2$ being inert in the conditions of the polymerisation process of the present invention; and
Y and Z are independently any group A or OA where A is optionally substituted hydrocarbyl inert in the conditions of the polymerisation process of the present invention, or Y is optionally substituted trialkylsilylalkyl,
and in that the $(Y_n)Z_pM—X—$ moieties are joined via their respective $R^2$ groups, either directly or indirectly the organic radical $\Omega$.

* * * * *